(12) United States Patent
Marchlewski et al.

(10) Patent No.: US 10,914,448 B2
(45) Date of Patent: Feb. 9, 2021

(54) VEHICLE LAMP INSTALLATION METHOD AND ASSEMBLY

(71) Applicant: Ford Global Technologies, LLC, Dearborn, MI (US)

(72) Inventors: Jack Marchlewski, Saline, MI (US); Robert Reiners, Grosse Ile, MI (US); Darrin Neil Wagner, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 16/241,140

(22) Filed: Jan. 7, 2019

(65) Prior Publication Data

US 2020/0217478 A1 Jul. 9, 2020

(51) Int. Cl.
*F21S 43/50* (2018.01)
*B60Q 1/26* (2006.01)

(52) U.S. Cl.
CPC ............ *F21S 43/51* (2018.01); *B60Q 1/2623* (2013.01); *B60Q 1/2649* (2013.01)

(58) Field of Classification Search
CPC ...... F21S 43/51; B60Q 1/2649; B60Q 1/2623
See application file for complete search history.

(56) References Cited

U.S. PATENT DOCUMENTS

| | | | |
|---|---|---|---|
| 4,994,942 A * | 2/1991 | Georgeff | B60Q 1/2607 362/368 |
| 7,631,845 B2 | 12/2009 | Shafer | |
| 2005/0190573 A1 | 9/2005 | Schwab | |
| 2013/0111728 A1 | 5/2013 | Frank et al. | |

FOREIGN PATENT DOCUMENTS

| | | |
|---|---|---|
| CN | 203780467 | 8/2014 |
| CN | 104015683 | 9/2014 |
| FR | 2959183 | 10/2011 |
| KR | 20150137287 | 12/2015 |

* cited by examiner

*Primary Examiner* — Thomas M Sember
(74) *Attorney, Agent, or Firm* — David Coppiellie, Esq.; Carlson, Gaskey & Olds, P.C.

(57) ABSTRACT

A vehicle lamp installation method includes, among other things, engaging both a mounting bracket and an outer panel of a vehicle with an alignment fixture that locates the mounting bracket relative to the outer panel in a mounting position. The method further includes securing the mounting bracket to a body structure of the vehicle when the mounting bracket is in the mounting position. A vehicle assembly includes, among other things, a body structure of a vehicle, a mounting bracket secured to the body structure in a mounting position, and an outer panel secured to the body structure. The mounting bracket is located in the mounting position relative to the outer panel using an alignment fixture that engages with both the outer panel and the mounting bracket.

15 Claims, 4 Drawing Sheets

VEHICLE LAMP INSTALLATION METHOD AND ASSEMBLY

TECHNICAL FIELD

This disclosure relates generally to installing a lamp on a vehicle and, in particular, on a vehicle that has removable outer panels.

BACKGROUND

Vehicles include outer panels. On some vehicles, the outer panels are designed to be removed by a user. This enables the user to periodically remove and replace the outer panels for aesthetic reasons or due to damage, as examples. The user may choose to replace the outer panels to provide their vehicle with a more rugged appearance, to equip their vehicle with outer panels that are better suited to off-roading, or for some other reason.

Vehicle lamps, such as taillamps, are often at least partially secured to outer panels when in an installed position on a vehicle. Accordingly, removing the vehicle lamp may be required before an outer panel can be removed and replaced.

SUMMARY

A vehicle lamp installation method according to an exemplary aspect of the present disclosure includes, among other things, engaging both a mounting bracket and an outer panel of a vehicle with an alignment fixture that locates the mounting bracket relative to the outer panel in a mounting position. The method further includes securing the mounting bracket to a body structure of the vehicle when the mounting bracket is in the mounting position.

Another exemplary embodiment of the foregoing method includes securing a lamp to the mounting bracket.

In another exemplary embodiment of any of the foregoing methods, after the securing, the outer panel can be decoupled from the body structure while the lamp remains secured to the mounting bracket, and while the mounting bracket remains secured to the body structure.

Another exemplary embodiment of any of the foregoing methods includes disengaging the alignment fixture from the mounting bracket and the outer panel. The disengaging is after the securing of the mounting bracket and before the securing of the lamp.

In another exemplary embodiment of any of the foregoing methods, the outer panel is coupled to the body structure in an installed position during the engaging and the securing.

In another exemplary embodiment of any of the foregoing methods, the engaging includes receiving at least one first pin of the outer panel or the alignment fixture within a corresponding first aperture provided by the other of the outer panel or the alignment fixture, and receiving at least one second pin of the mounting bracket or the alignment fixture within a corresponding second aperture provided by the other of the mounting bracket or the alignment fixture.

Another exemplary embodiment of any of the foregoing methods includes securing the mounting bracket to the body structure using mechanical fasteners.

Another exemplary embodiment of any of the foregoing methods includes securing the mounting bracket through access apertures in the alignment fixture.

In another exemplary embodiment of any of the foregoing methods, the outer panel is a rear quarter panel and the lamp is a rear taillamp.

In another exemplary embodiment of any of the foregoing methods, the lamp is nested within an opening of the outer panel such that the outer panel extends along an upwardly facing surface of the lamp and further extends along an outboard facing surface of the lamp.

A vehicle assembly according to another exemplary aspect of the present disclosure includes, among other things, a body structure of a vehicle, a mounting bracket secured to the body structure in a mounting position, and an outer panel secured to the body structure. The mounting bracket is located in the mounting position relative to the outer panel using an alignment fixture that engages with both the outer panel and the mounting bracket.

Another exemplary embodiment of the foregoing assembly includes a lamp secured to the mounting bracket.

In another exemplary embodiment of any of the foregoing assemblies, the outer panel is a rear quarter panel and the lamp is a rear taillamp.

Another exemplary embodiment of any of the foregoing assemblies includes a plurality of mechanical fasteners that secure the mounting bracket to the body structure.

In another exemplary embodiment of any of the foregoing assemblies, the alignment fixture is configured to engage with the outer panel and the mounting bracket through a plurality of pins received within respective apertures.

In another exemplary embodiment of any of the foregoing assemblies, the lamp is nested within an opening of the outer panel such that the outer panel extends along an upwardly facing surface of the lamp and further extends along an outboard facing surface of the lamp.

In another exemplary embodiment of any of the foregoing assemblies, the outer panel is configured to be removed from the body structure while the mounting bracket remains secured to the body structure.

In another exemplary embodiment of any of the foregoing assemblies, the outer panel is securable to the body structure with a plurality of mechanical fasteners.

In another exemplary embodiment of any of the foregoing assemblies, all portions of the mounting bracket are spaced from all portions of the outer panel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a lamp of a vehicle. The vehicle can include removable outer panels.

During assembly, one of the outer panels is first secured to a body structure of the vehicle in an installed position. Next, an alignment fixture is used to position a mounting bracket relative to the outer panel. Once positioned, the mounting bracket is secured to the body structure. The alignment fixture is then removed, and a lamp is secured to the mounting bracket. Since the mounting bracket was positioned relative to the outer panel and the lamp is secured to the mounting bracket, the position of the lamp relative to the outer panel is controlled.

Controlling the positioning of the lamp relative to the outer panel can help to maintain desired spacing between the lamp and the outer panel, which can facilitate meeting appearance goals. Due to the alignment fixture, the positioning of the lamp relative to the outer panel can be controlled without the lamp directly engaging the outer panel. Because the lamp does not directly engage the outer panel, the outer panel is able to be removed from the body structure while the lamp remains secured to the body structure through the mounting bracket. The alignment fixture substantially transfers lamp locators from the outer panel to the body structure.

Figure 1:
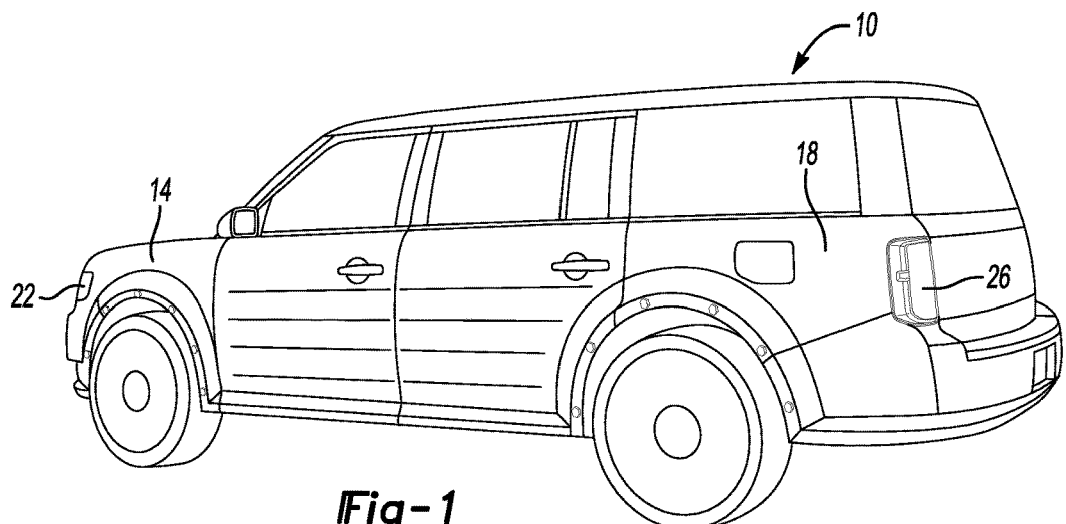
FIG. 1 illustrates a perspective view of an example vehicle having removable outer panels.

With reference to FIG. 1, an example vehicle 10 includes a plurality of outer panels 14, 18, and a plurality of lamps 22, 26. The outer panel 14 is a front fender, and the outer panel 18 is a rear quarter panel. The lamp 22 is a headlamp, and the lamp 26 is a taillamp. At least the outer panel 18 is removable. A user may wish to remove the outer panel 18 and replace it with a different outer panel to change an appearance of the vehicle 10.

Figure 2:
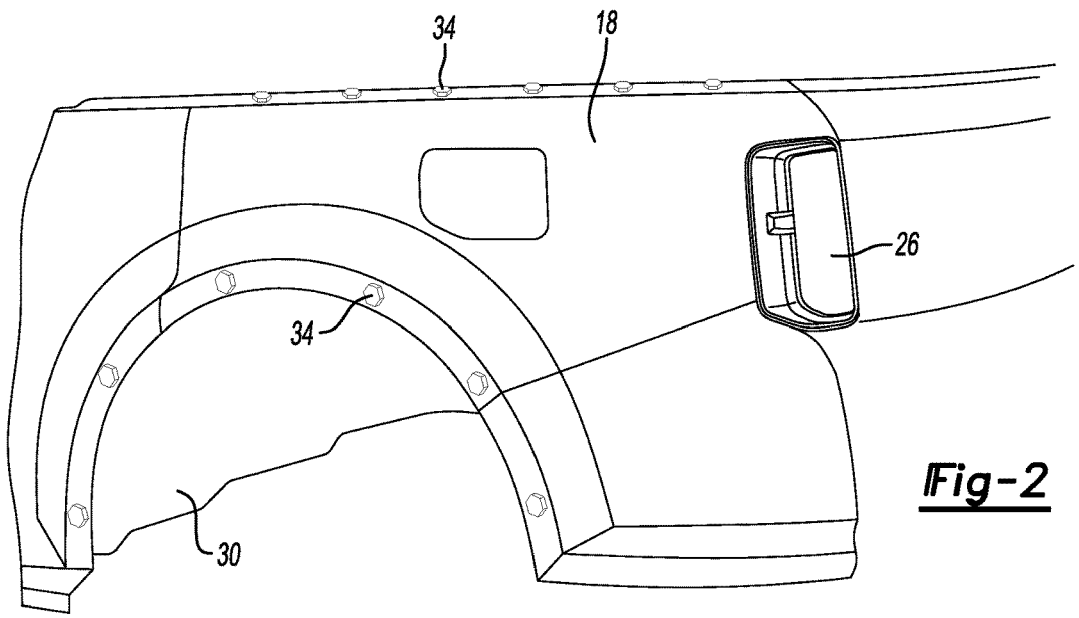
FIG. 2 illustrates a close-up view of selected portions of the vehicle of FIG. 1 showing a rear quarter panel secured to a body structure.

With reference now to FIG. 2, the outer panel 18 can be secured to a body structure 30 of the vehicle 10 in an installed position. The outer panel 18 can be secured to the body structure 30 with a plurality of mechanical fasteners 34, such as bolts.

Generally, the body structure 30 is a rigid, or fixed, part of the vehicle 10. Requirements may necessitate that each lamp of the vehicle 10, such as the lamps 22 and 26, remain secured to a rigid part of the vehicle 10 unless repair of the lamps 22 and 26 is required. The body structure 30 can include rigid parts of the vehicle 10 such a bodyside, pillar structure, a front floor, under floor, frame, engine compartment, etc. Here, the body structure 30 is an upper body structure.

Figure 3:
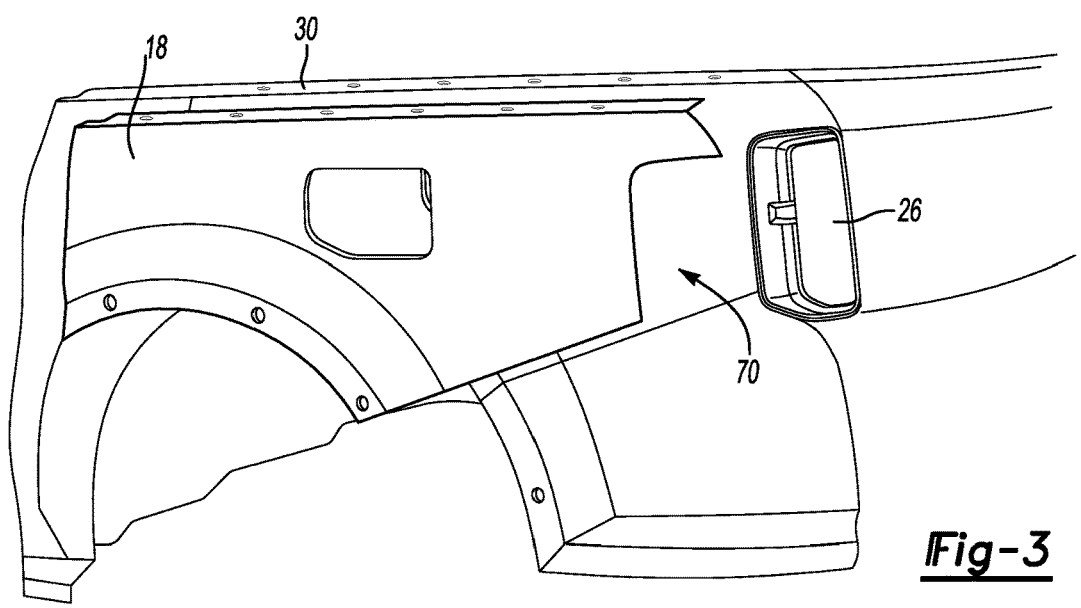
FIG. 3 illustrates the rear quarter panel of FIG. 2 removed from the body structure.

In this exemplary embodiment, a user can remove the outer panel 18 from the vehicle 10 by disengaging the mechanical fasteners 34. Once disengaged, the outer panel 18 can be removed from the body structure 30 as shown in FIG. 3. Notably, the lamp 26 can remain mounted to the body structure 30 as the outer panel 18 is removed. That is, demounting the lamp 26 from the body structure 30 is not required to remove the outer panel 18. Thus, the outer panel 18 can be removed and replaced while meeting requirements to keep the lamp 26 secured.

Figure 4:
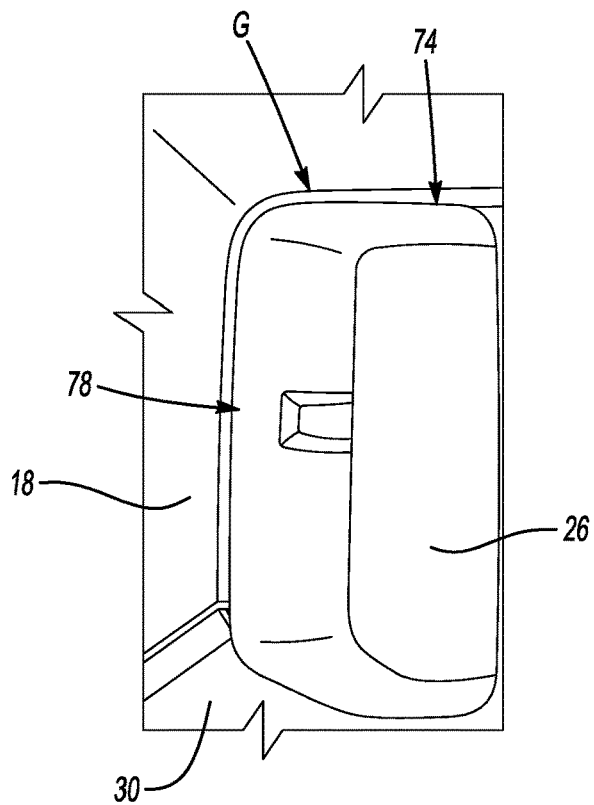
FIG. 4 illustrates a close-up view of a taillamp interfacing with a portion of the rear quarter panel.

As shown in FIG. 4, there are gaps G between the outer panel 18 and the lamp 26 when the outer panel 18 and the lamp 26 are mounted to the body structure 30. Fit and finish requirements can necessitate that the gaps G fall within a set range—gaps outside the set range could be aesthetically unacceptable.

Build tolerances and other variables can influence a size of the gaps G. For example, although the outer panel 18 can be fixture set when mounting to the body structure 30, the precise positioning of the outer panel 18 can vary by, say, ±3.0 millimeters. If the lamp 26 is not positioned to accommodate for these variations, the variations can cause the gaps G to fall outside the set range.

A size of the gaps G could be controlled, in part, by mounting of at least a portion of the lamp 26 to the outer panel 18 such that the lamp 26 is located directly from the outer panel 18. This, however, could prevent a user from swapping the outer panel 18 for another while keeping the lamp 26 secured to the body structure 30.

Figure 5:
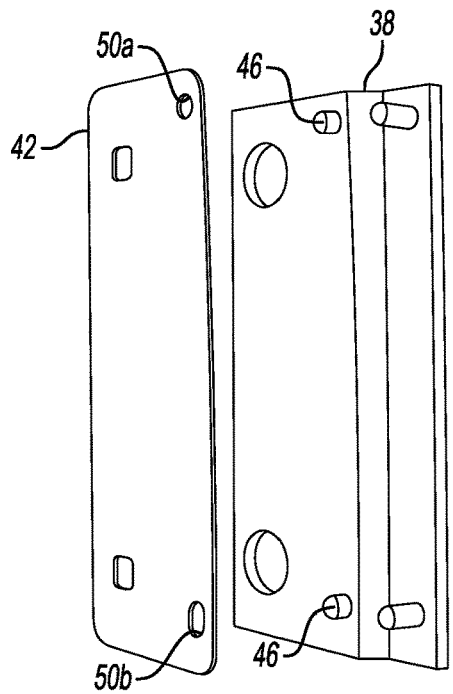
FIG. 5 illustrates a perspective view of a mounting bracket disengaged from an alignment fixture.
Figure 6:
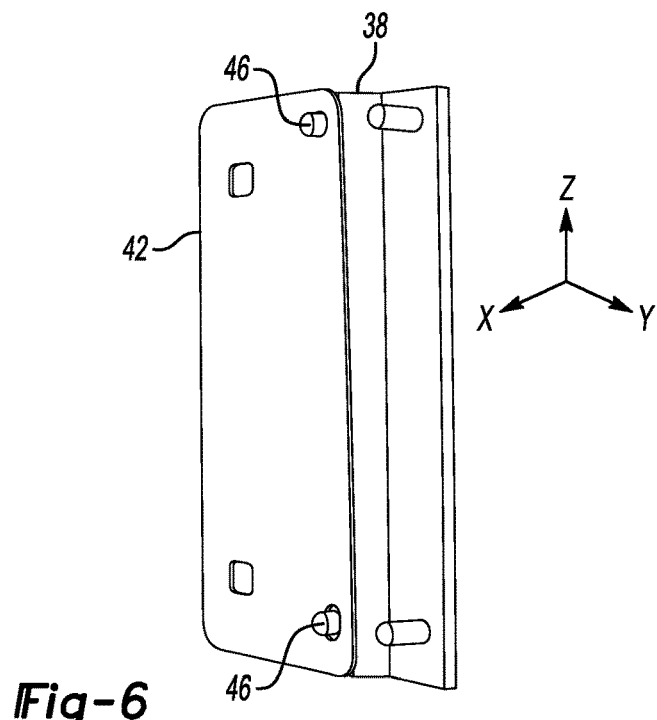
FIG. 6 illustrates the mounting bracket and alignment fixture of FIG. 5 when engaged.
Figure 7:
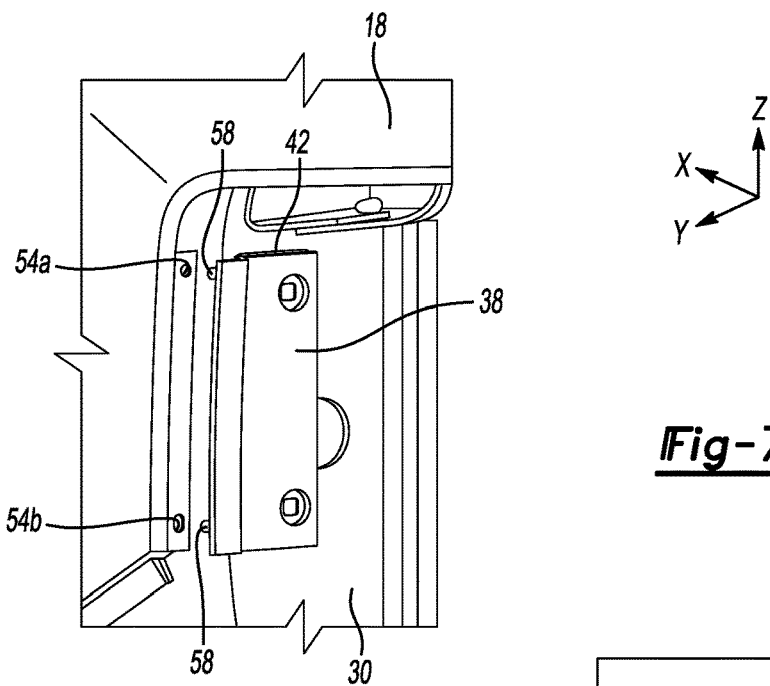
FIG. 7 illustrates the mounting bracket and alignment fixture of FIG. 6 moved toward a position where the alignment fixture engages the rear quarter panel of FIG. 3.

Referring to FIGS. 5-7, an alignment fixture 38 is utilized when securing the lamp 26 to a fixed structure of the vehicle 10 (FIG. 1). The alignment fixture 38 helps to position the lamp 26 relative to the outer panel 18. The alignment fixture 38 helps position the lamp 26 without requiring the lamp 26 to directly mount to the outer panel 18.

Generally, the alignment fixture 38 positions a mounting bracket 42 relative to the outer panel 18 in a mounting position. The mounting bracket 42 is then secured to the body structure 30 such that the mounting bracket 42 becomes a fixed structure of the vehicle 10. The lamp 26 mounts to the mounting bracket 42. When the lamp 26 mounts to the mounting bracket 42, the lamp 26 is positioned relative to the outer panel 18 such that the gaps G are within the set range. The alignment fixture 38 is utilized when securing the mounting bracket 42 in the mounting position, but is removed from the vehicle 10 prior to securing the lamp 26 to the body structure 30.

To secure the lamp 26, the alignment fixture 38 is moved from a position shown in FIG. 5 where the alignment fixture 38 is disengaged from the mounting bracket 42, to a position shown in FIG. 6 where the alignment fixture 38 is engaged with the mounting bracket 42.

Engagement between the mounting bracket 42 and the alignment fixture 38 comprises pins 46 of the alignment fixture 38 being positioned within corresponding apertures 50A, 50B of the mounting bracket 42.

The aperture 50A has a circular profile whereas the aperture 50B has a profile that is extended longitudinally along a Z-Axis. These profiles provide the locating functionality when the pins 46 are received within the respective apertures 50A, 54B. The aperture 50A locates the alignment fixture 38 and the mounting bracket 42 along the Z-axis and along a Y-axis. The aperture 50B locates the alignment fixture 38 relative to the mounting bracket 42 along the Y-axis.

Although the pins 46 extend from the alignment fixture 38 and the apertures 50A, 50B are within the mounting bracket 42, these components could be reversed such that the pins 46 extend from the mounting bracket 42 and the apertures 50A, 50B are within the alignment fixture 38.

As shown in FIG. 6, the alignment fixture 38 engaged with the mounting bracket 42 is then moved toward locating apertures 54A and 54B within the outer panel 18. After sufficient movement, an aperture 54A in the outer panel 18 receives a pin 58 of the alignment fixture 38, and an aperture 54B in the outer panel 18 receives another pin 58 of the alignment fixture 38. When the pins 58 are received within the apertures 54A, 54B, the alignment fixture 38 is engaged with the outer panel 18.

The aperture 54A has a circular profile whereas the aperture 54B has a profile that is extended longitudinally along a Z-Axis. These profiles provide a locating functionality when the pins 58 are received within the respective apertures 54A, 54B. The aperture 54A locates the alignment fixture 38 relative to the outer panel 18 along the Z-axis and along the Y-axis. The aperture 54B locates the alignment fixture 38 relative to the outer panel 18 along the Y-axis. Because the alignment fixture 38 is engaging the mounting bracket 42, locating the alignment fixture 38 relative to the outer panel 18 locates the mounting bracket 42 relative to the outer panel 18.

Although the pins 58 extends from the alignment fixture 38 and the apertures 54A, 54B are within the mounting bracket 42, these could be reversed such that the pins 58 extend from the mounting bracket 42 and the apertures 54A, 54B are within the alignment fixture 38.

Figure 8:
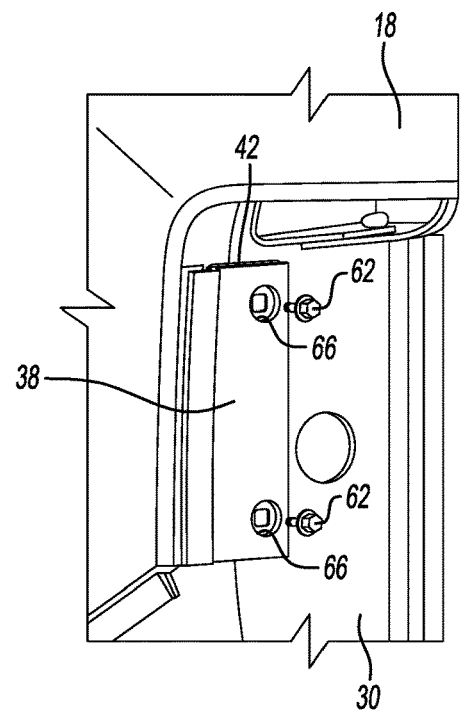
FIG. 8 illustrates the mounting bracket and alignment fixture of FIG. 6 in the position where the alignment fixture engages the rear quarter panel of FIG. 3.

FIG. 8 shows the alignment fixture 38 engaged with both the mounting bracket 42 and the outer panel 18. When in this position, mechanical fasteners 62 are moved through access apertures 66 in the alignment fixture 38. The mechanical fasteners 62 are torqued down to seat the mechanical fasteners 62 and hold the mounting bracket 42 relative to the body structure 30. When secured, the mounting bracket 42 is part of a fixed structure of the vehicle 10.

Figure 9:
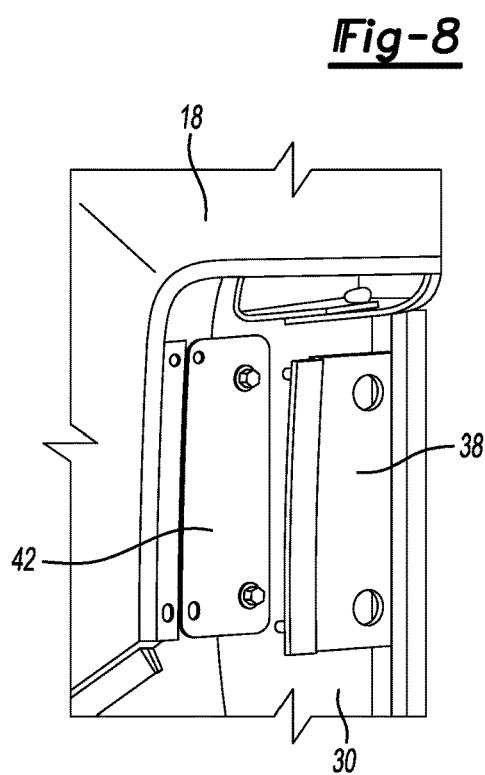
FIG. 9 illustrates the mounting bracket secured to the body structure and the alignment fixture disengaged from both the rear quarter panel and the mounting bracket.
Figure 10:
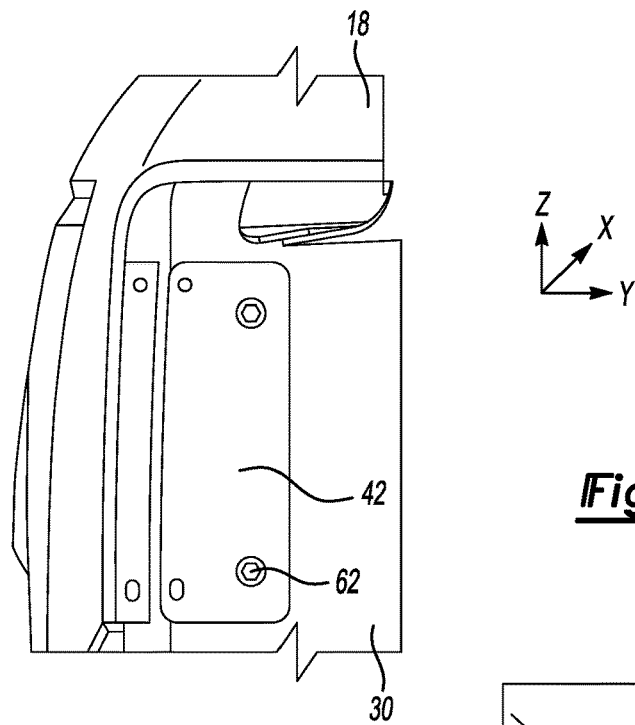
FIG. 10 illustrates an end view of the mounting bracket secured to the body structure.

The alignment fixture 38 is then removed as shown in FIG. 9. After the alignment fixture 38 has been removed as shown in FIG. 10, the mounting bracket 42 and outer panel 18 remain positioned relative to one another since both are secured to the body structure 30.

Figure 11:
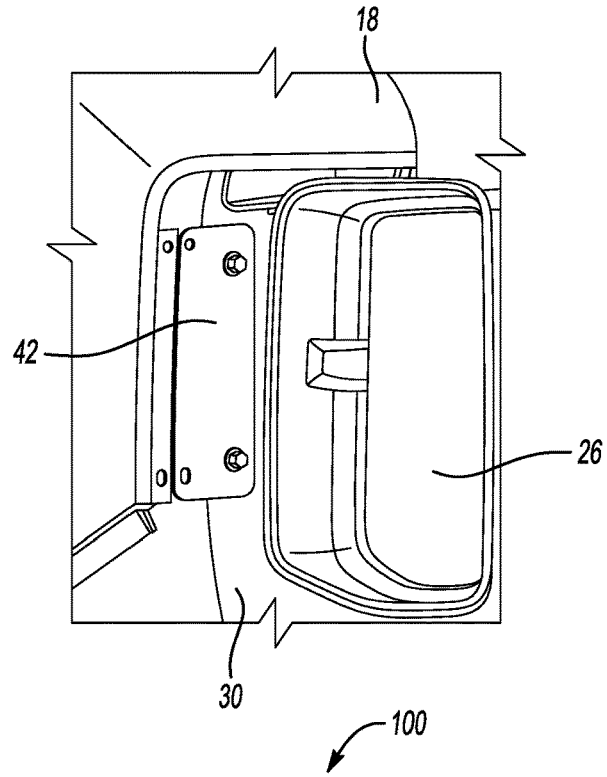
FIG. 11 illustrates the taillamp of FIG. 3 moved toward an installed position.
Figure 12:
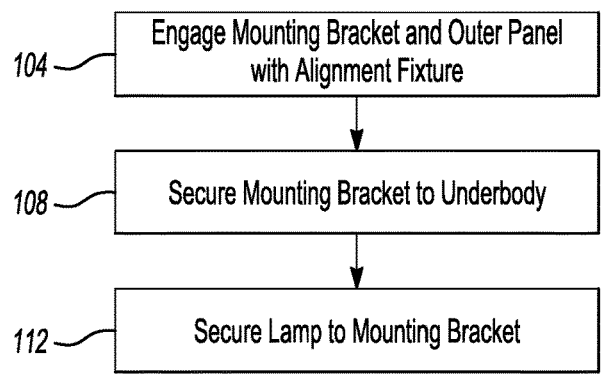
FIG. 12 illustrates the flow of an exemplary method of installing the taillamp using the alignment fixture.

The lamp 26 is then moved toward the mounting bracket 42 as shown in FIG. 11 and secured to the mounting bracket 42 to hold the position of the lamp 26 relative to the body structure 30. When the lamp 26 is secured to the mounting bracket 42, as shown in FIG. 4, the gaps G meet fit and finish requirements.

Notably, after securing the lamp 26 to the mounting bracket 42 as shown in FIG. 4, the outer panel 18 can be decoupled from the body structure 30 while the lamp 26 remains secured to the body structure 30 through the mounting bracket 42.

When in the installed position, the lamp 26 is nested within an opening 70 of the outer panel 18 such that the outer panel 18 extends along an upwardly facing surface 74 of the lamp 26 and additionally along an outboard facing surface 78 of the lamp 26. The gaps G extend between the outer panel 18 and both the upwardly facing surface 74 and the outboard facing surface 78.

A general vehicle lamp installation method 100 utilizing the techniques described above can begin at a step 104 where both a mounting bracket and an outer panel of a vehicle are engaged within an alignment fixture. The alignment fixture locates the mounting bracket relative to the outer panel in a mounting position. The outer panel is attached to a fixed structure of a vehicle.

Next, at a step 108, the mounting bracket is secured to the body structure of the vehicle, which holds the position of the mounting bracket relative to the outer panel.

The method 100 then, at a step 112, secures a lamp to the mounting bracket. Because the mounting bracket was positioned relative to the outer panel, gaps between the lamp and the outer panel can be reliably controlled. Because the lamp is secured to the mounting bracket, but not the outer panel, the outer panel can be removed as required without significantly disturbing the position of the lamp.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle lamp installation method, comprising:
engaging both a mounting bracket and an outer panel of a vehicle with an alignment fixture that locates the mounting bracket relative to the outer panel in a mounting position;
securing the mounting bracket to a body structure of the vehicle when the mounting bracket is in the mounting position; and
securing a lamp to the mounting bracket, wherein, after the securing, the outer panel can be decoupled from the body structure while the lamp remains secured to the mounting bracket, and while the mounting bracket remains secured to the body structure.

2. A vehicle lamp installation method, comprising:
engaging both a mounting bracket and an outer panel of a vehicle with an alignment fixture that locates the mounting bracket relative to the outer panel in a mounting position;
securing the mounting bracket to a body structure of the vehicle when the mounting bracket is in the mounting position;
securing a lamp to the mounting bracket; and
disengaging the alignment fixture from the mounting bracket and the outer panel, the disengaging after the securing of the mounting bracket and before the securing of the lamp.

3. The lamp installation method of claim 1, wherein the outer panel is coupled to the body structure in an installed position during the engaging and the securing.

4. The lamp installation method of claim 1, wherein the engaging comprises receiving at least one first pin of the outer panel or the alignment fixture within a corresponding first aperture provided by the other of the outer panel or the alignment fixture, and receiving at least one second pin of the mounting bracket or the alignment fixture within a corresponding second aperture provided by the other of the mounting bracket or the alignment fixture.

5. The lamp installation method of claim 1, further comprising securing the mounting bracket to the body structure using mechanical fasteners.

6. The lamp installation method of claim 5, further comprising securing the mounting bracket through access apertures in the alignment fixture.

7. The lamp installation method of claim 1, wherein the outer panel is a rear quarter panel and the lamp is a rear taillamp.

8. The lamp installation method of claim 1, wherein the lamp is nested within an opening of the outer panel such that the outer panel extends along an upwardly facing surface of the lamp and further extends along an outboard facing surface of the lamp.

9. A vehicle assembly, comprising:
a body structure of a vehicle;
a mounting bracket secured to the body structure in a mounting position;
an outer panel secured to the body structure, the mounting bracket located in the mounting position relative to the outer panel using an alignment fixture that engages with both the outer panel and the mounting bracket; and
   a lamp secured to the mounting bracket, wherein the lamp is nested within an opening of the outer panel such that the outer panel extends along an upwardly facing surface of the lamp and further extends along an outboard facing surface of the lamp.

10. The vehicle assembly of claim 9, wherein the outer panel is a rear quarter panel and the lamp is a rear taillamp.

11. The vehicle assembly of claim 9, further comprising a plurality of mechanical fasteners that secure the mounting bracket to the body structure.

12. The vehicle assembly of claim 9, wherein the alignment fixture is configured to engage with the outer panel and the mounting bracket through a plurality of pins received within respective apertures.

13. The vehicle assembly of claim 9, wherein the outer panel is configured to be removed from the body structure while the mounting bracket remains secured to the body structure.

14. The vehicle assembly of claim 9, wherein the outer panel is securable to the body structure with a plurality of mechanical fasteners.

15. The vehicle assembly of claim 9, wherein all portions of the mounting bracket are spaced from all portions of the outer panel.

\* \* \* \* \*